F. L. MORSE.
VALVE OPERATING MECHANISM.
APPLICATION FILED APR. 1, 1913. RENEWED FEB. 18, 1915.
1,156,921.
Patented Oct. 19, 1915.
2 SHEETS—SHEET 2.
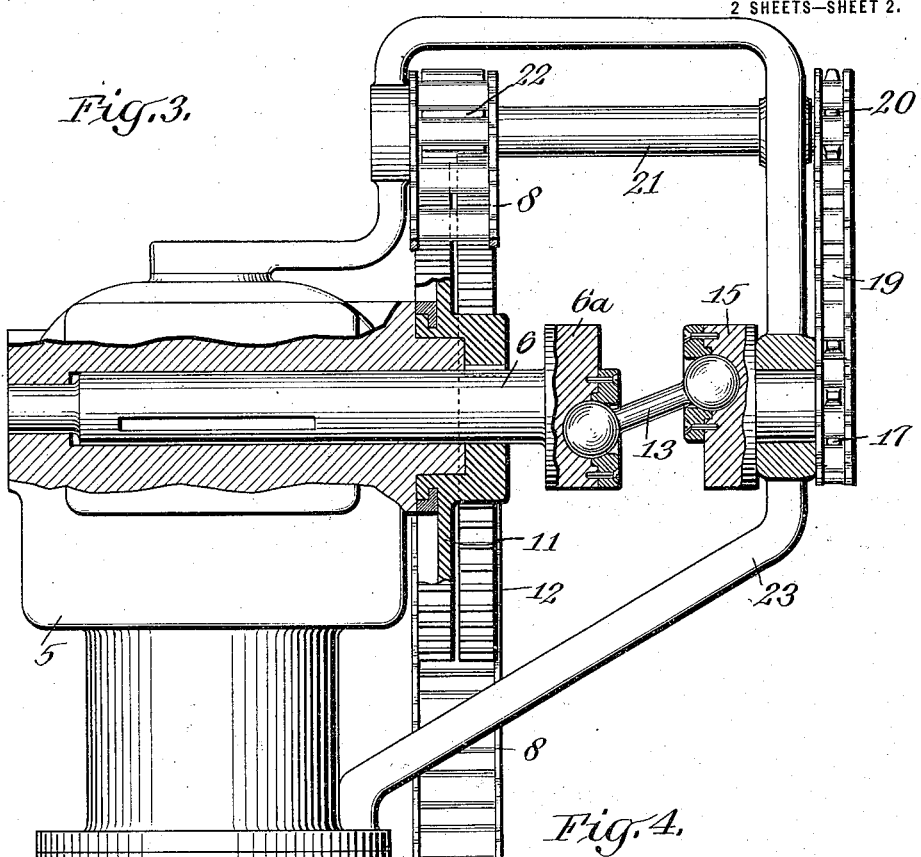
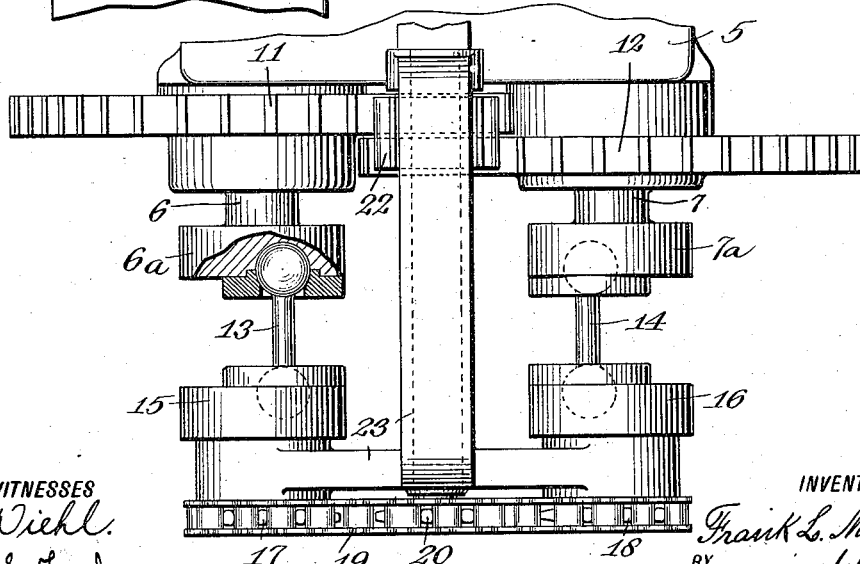

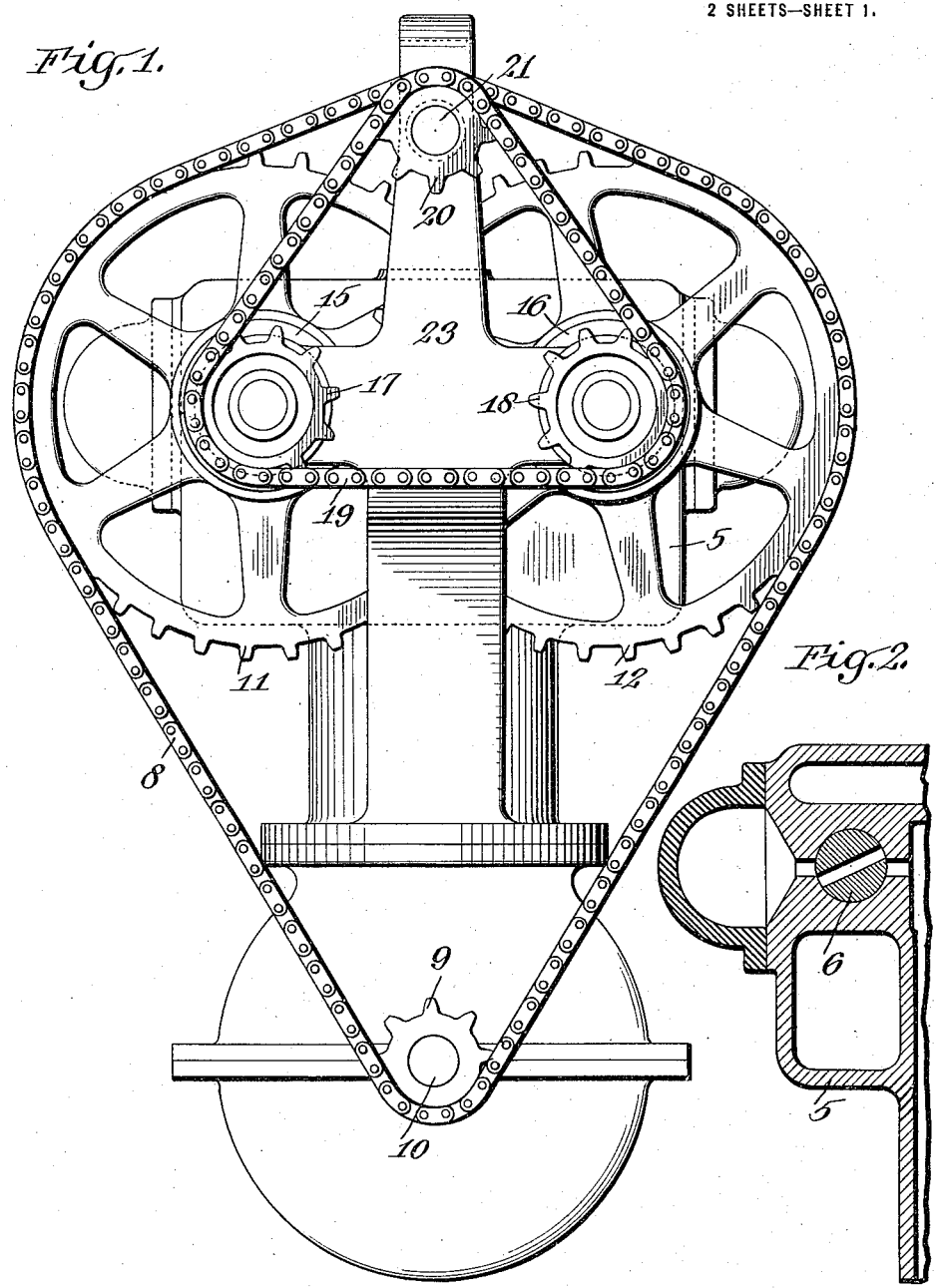

UNITED STATES PATENT OFFICE.

FRANK L. MORSE, OF ITHACA, NEW YORK.

VALVE-OPERATING MECHANISM.

1,156,921. Specification of Letters Patent. Patented Oct. 19, 1915.

Application filed April 1, 1913, Serial No. 758,155. Renewed February 18, 1915. Serial No. 9,181.

*To all whom it may concern:*

Be it known that I, FRANK L. MORSE, a citizen of the United States, residing at Ithaca, in the county of Tompkins and State of New York, have invented a certain new and useful Improvement in Valve-Operating Mechanism, of which improvement the following is a specification.

This invention relates to mechanism for operating valves of the rotary or oscillating cylindrical type, such as used in connection with engines, pumps, or other fluid pressure devices in which the valve is adapted to be driven continuously through its successive traverses, while the machine is running.

The principal object of my invention is to prevent irregular wear of the valve upon its seat, and it comprises means for producing a relative longitudinal movement between the valve and its seat at the same time that the valve is being rotated or oscillated for the proper distribution of the fluid through the admission and discharge ports of the motor, whereby the track of the valve is shifted and no given point describes exactly the same path during the successive traverses of the valve. This produces a continuous polishing action between the valve and its seat, resulting in uniform wear.

In the accompanying drawing, I have illustrated my improvement in connection with a gas engine having separate supply and exhaust valves of the rotary cylindrical type, although it is not limited to this construction.

Figure 1 is an elevation of the engine and valve operating mechanism embodying my improvement; Fig. 2, a transverse section of a portion of the engine showing one of the valves; Fig. 3, an elevation at right angles to Fig. 1, a portion being shown in longitudinal section in a plane substantially in line with one of the valves; and, Fig. 4, a plan of the valve operating mechanism.

According to the construction shown in the drawings, the engine, 5, is provided with separate supply and exhaust valves, 6 and 7, which are of the rotary cylindrical type mounted in corresponding seats at opposite sides of the engine cylinder and driven by a chain, 8, passing over a sprocket or gear wheel, 9, on the crank shaft, 10, and sprocket wheels, 11 and 12, keyed upon the respective valves, 6 and 7. During the running of the engine, the valves, by means of this mechanism, operate continuously through their successive traverses or revolutions to effect the proper opening and closing of the admission and discharge ports of the engine cylinder.

In order to produce a uniform wear of the valve upon its seat, in accordance with my invention, any suitable means may be employed for effecting an endwise or longitudinal movement of the valve relative to its seat during the successive traverses or revolutions, and as a preferred mechanism for producing this result, the valves may be provided, at their ends, with flanges or heads, 6ª and 7ª, to which are pivotally connected the link bars, 13 and 14, respectively, the point of connection being at one side of the center or the axis of the valve. In this way the link bar will produce an endwise or longitudinal movement of the valve, during its successive rotations. In order that the endwise movement of the valves may change during the successive revolutions, the opposite end of the respective link bars may be pivotally connected to the rotatable heads or disks, 15 and 16, driven by the respective sprockets, 17 and 18, chain, 19, and sprocket, 20, mounted on shaft, 21, which is driven by the idler sprocket gear, 22, over which the chain, 8, passes.

The rotatable heads, 15 and 16, are preferably mounted in bearings in a frame or yoke, 23, and in line with the axes of the respective valves, 6 and 7, and the link bars are connected to the heads by ball and socket joints at points outside of the axis of rotation, so that, as the head, 15, rotates at a different rate of speed from the valve, it will be seen that the angle of inclination of the link bar, 13, will be constantly changing, thereby producing a corresponding longitudinal movement of the valve during its successive revolutions.

Any desired ratio between the sprocket gears, 20, and 17 and 18, may be employed to produce the preferred difference in the rate of rotation between the disks, 15, and 16, and the valves, whereby the track of the valve is constantly shifted and any given point will not describe the same path during the successive revolutions of the valve. This produces a continuous polishing action between the valve and its seat, resulting in uniform wear, and increasing the periods of time during which the valves may be used without refitting and other repairs.

Having now described my invention, what I claim as new and desire to secure by Letters Patent is:

1. In a valve mechanism, the combination with a cylindrical valve and seat, of a driving connection for turning said valve, and means coöperating with said driving connection for effecting a relative longitudinal movement between the valve and seat to shift the path described during its successive traverses.

2. In a valve mechanism, the combination with a rotary cylindrical valve and seat, of a driving connection for rotating said valve, and means coöperating with said driving connection for effecting a relative longitudinal movement between the valve and seat to shift the path described during its successive revolutions.

3. In a valve mechanism, the combination with a rotary cylindrical valve and seat, of a driving connection for rotating said valve, and means operating automatically to shift the valve to change the path described by a given point thereof during the successive revolutions.

4. In a valve mechanism, the combination with a rotary cylindrical valve and seat, of a driving connection for rotating said valve, a link bar pivotally connected at the end of the valve, and means coöperating with said driving connection for actuating said link bar and causing a longitudinal movement of the valve during its successive revolutions.

5. In a valve mechanism, the combination with a rotary cylindrical valve and seat, of a driving connection for rotating said valve, and a link bar eccentrically connected by a universal joint at the end of the valve for causing a longitudinal movement thereof.

6. In a valve mechanism, the combination with a rotary cylindrical valve and seat, of a driving connection for rotating said valve, a link bar eccentrically connected by a universal joint at the end of the valve, and means for moving the other end of the link bar at a different rate of speed.

7. In a valve mechanism, the combination with a rotary cylindrical valve and seat, of a driving connection for rotating said valve, a rotatable head opposite the end of the valve, and a link bar having a pivotal connection at one end to the valve and at the other end to said head.

8. In a valve mechanism, the combination with a rotary cylindrical valve and seat, of a driving connection for rotating said valve, said valve having a flange at its end, a rotatable head opposite said flange, means for rotating said head at a different rate of speed, and a link bar having universal joint connections eccentrically to said flange and head.

FRANK L. MORSE.

Witnesses:
P. C. COLT,
D. B. PERRY.

Copies of this patent may be obtained for five cents each, by addressing the "Commissioner of Patents, Washington, D. C."